Dec. 22, 1964   H. G. MATHEWS   3,161,911
MOLD FOR FOAMED PANELS AND THE LIKE
Filed Oct. 2, 1962   3 Sheets-Sheet 1

INVENTOR.
HOWARD G. MATHEWS
BY
Dicke & Craig
ATTORNEYS.

Dec. 22, 1964  H. G. MATHEWS  3,161,911
MOLD FOR FOAMED PANELS AND THE LIKE
Filed Oct. 2, 1962  3 Sheets-Sheet 2

INVENTOR.
HOWARD G. MATHEWS
BY *Dicke & Craig*
ATTORNEYS.

Dec. 22, 1964        H. G. MATHEWS        3,161,911

MOLD FOR FOAMED PANELS AND THE LIKE

Filed Oct. 2, 1962        3 Sheets-Sheet 3

INVENTOR.
HOWARD G. MATHEWS
BY *Dicke & Craig*
ATTORNEYS.

3,161,911
MOLD FOR FOAMED PANELS AND THE LIKE
Howard G. Mathews, Levittown, N.J., assignor to Foam Products Corporation, Thomasville, Ga., a corporation of Georgia
Filed Oct. 2, 1962, Ser. No. 227,883
7 Claims. (Cl. 18—5)

The present invention relates to improvements in molds, and more particularly to improvements in molds especially adapted to the production of foamed panels of large sizes.

It is a primary object of the present invention to provide improved molds for producing foamed panels and which molds are readily adjustable to enable changes in sizes of the panels produced.

Another object of the present invention is to provide improved molds for the production of foamed panels of large size such as mattresses and panels for use in insulated enclosures.

A further object of the present invention is to provide molds which enable more economical and efficient production of polyurethane foam panels and the like.

Still another object of the present invention is to provide improved platen elevating means for molds.

A still further object of the present invention is to provide improved hold-down means for the upper platen of a mold.

One specific embodiment of a mold in accordance with the present invention includes frame means, a lower platen, and an upper platen movable with respect to the lower platen. The frame means includes a vertical portion adjacent the rear side of the platens and a horizontal portion extending above the platens. Hold-down arm means extend between the horizontal portion of the frame means and the upper platen. The hold-down arms means include a plurality of upper and lower arm portions pivotally connected to each other and which are essentially in vertical alignment in a closed mold position. Each upper arm portion is connected to rotatable shaft means mounted at the horizontal frame, and each lower arm portion is pivotably connected to the upper platen. Platen elevating means including inclined fluid pressure cylinder means having piston means are secured to the frame means. Hinge means at the rear of the upper platen including a plurality of spaced upright members provided with essentially vertical slots and a bearing shaft connected to the upper platen and slidable within the slots cooperate with the cylinder means to enable the upper platen to be moved to an inclined open position.

In accordance with another embodiment of the present invention, a plurality of essentially vertical hydraulic cylinders are positioned between the horizontal portion of the frame means and the upper plane in lieu of the hold-down arms and inclined cylinder means of the first-mentioned embodiment.

The foregoing and other objects, features, and advantages of the present invention will become more apparent from the following description when taken in conjunction with the drawings wherein.

Figure 1:
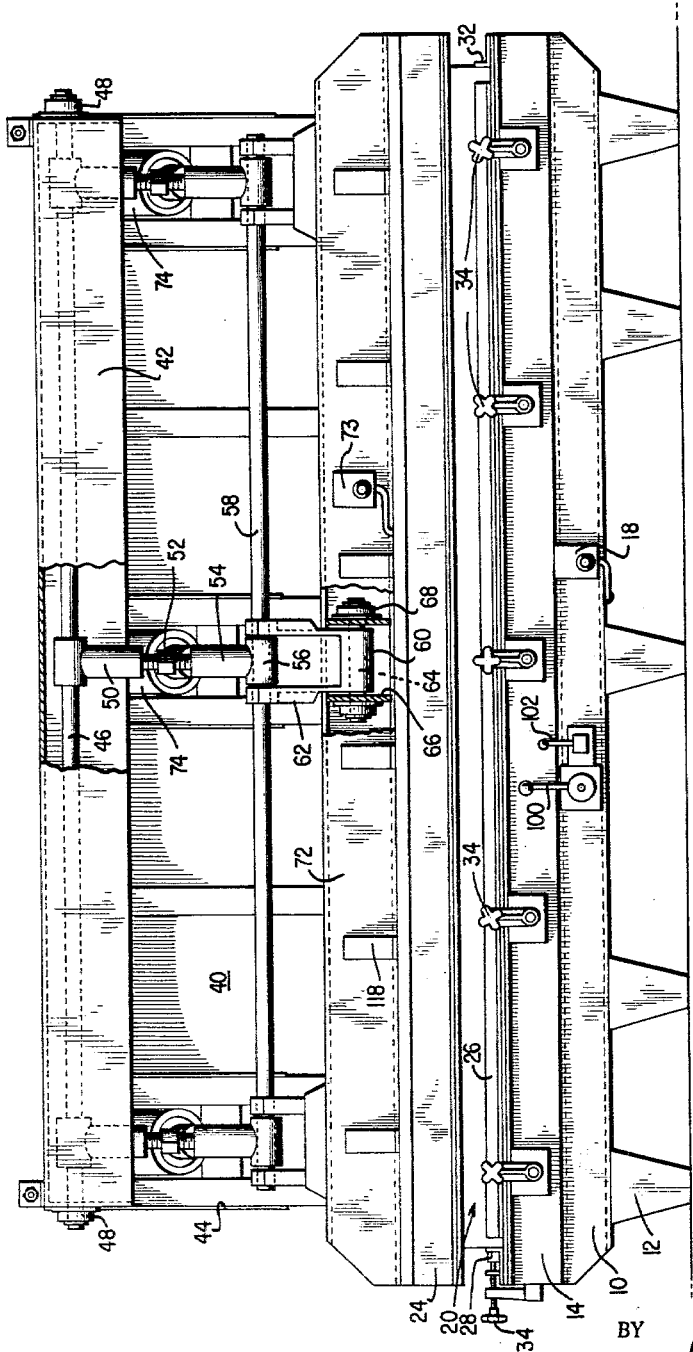
FIGURE 1 is a front view of one embodiment of a mold in accordance with the present invention with parts thereof broken away for the sake of clarity.

Referring now to the drawings, and more particularly to FIGURE 1, reference numeral 10 designates a support base for the mold which is formed of spaced angle irons and is mounted upon support legs 12. A lower platen 14 rests upon the support base. Lower platen 14 has an upper mold surface 16 consisting of a material of good thermal conductivity such as aluminum. Surface 16 is heated by electric strip heaters (not shown) which are regulated by a thermostat 18 which is mounted upon the support base.

Reference numeral 20 generally designates a suitable side mold form which laterally restrains the panel being formed in the mold and which will be described in detail hereinafter. Form 20 is removably positioned upon mold surface 16, and in the closed molding position is closed off by a mold surface 22 of an upper platen 24. Mold form 20 is held in position upon mold surface 16 during the molding operation by means of an adjustable front guide member 26 and an adjustable left side guide member 28 operating in conjunction with a fixed rear abutment 30 and a fixed right side abutment 32. Guide members 26 and 28 may be tightened against mold form 20 by suitable manually operated screw adjustment members 34 spaced at intervals along the guide members. Adjustment members 34 are threadably received in support arm members 36 which are secured to lower platen 14 in any suitable manner such as by bolts 38.

An upper mold frame constructed in any suitable manner such as by sheet metal secured to angle iron includes a vertical rear portion 40 and an upper essentially horizontal frame portion 42 extending forwardly over the platens. Suitable reinforcing means 44 interconnect frame portions 40 and 42. A horizontal shaft 46 is positioned along the front edge of upper frame part 42 within bearings 48 at opposite ends of the frame. Three depending T-shaped tubular connectors 50 are mounted upon shaft 46. The lower ends of connectors 50 threadably receive length adjusting members 52 which are connected at their lower ends to inverted T-shaped connectors 54. The threads of connectors 50 are of the opposite hand to the threads of connectors 54. The lower ends 56 of connectors 54 are mounted upon a horizontal shaft 58. Connectors 50 and 54, along with length adjusting members 52, effectively form upper arm portions of hold-down arms extending between the overhanging frame portion 42 and the upper platen 24. The lower arm portions of the hold-down arms include three arm links 60 having forked upper ends 62 rotatable upon shaft 58 and surrounding the lower ends 56 of connectors 54. The other ends of links 60 receive stub shafts 64 rotatably positioned in transverse wall partitions 66 by bearings 68. Partitions are welded or otherwise suitably secured between opposed U-shaped channel members 70 and 72 which in turn are secured to upper platen 24. A thermostat 73, fastened to channel member 72, regulates the operation of electric heaters for the upper platen.

Figure 2:
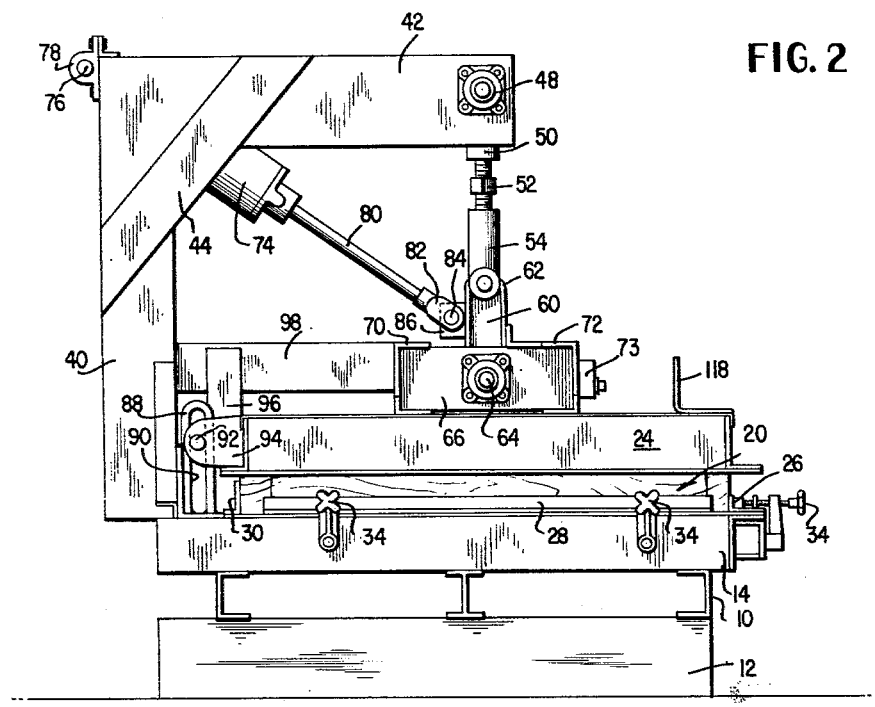
FIGURE 2 is a side view of the press shown in FIGURE 1 in the closed operating position.
Figure 3:
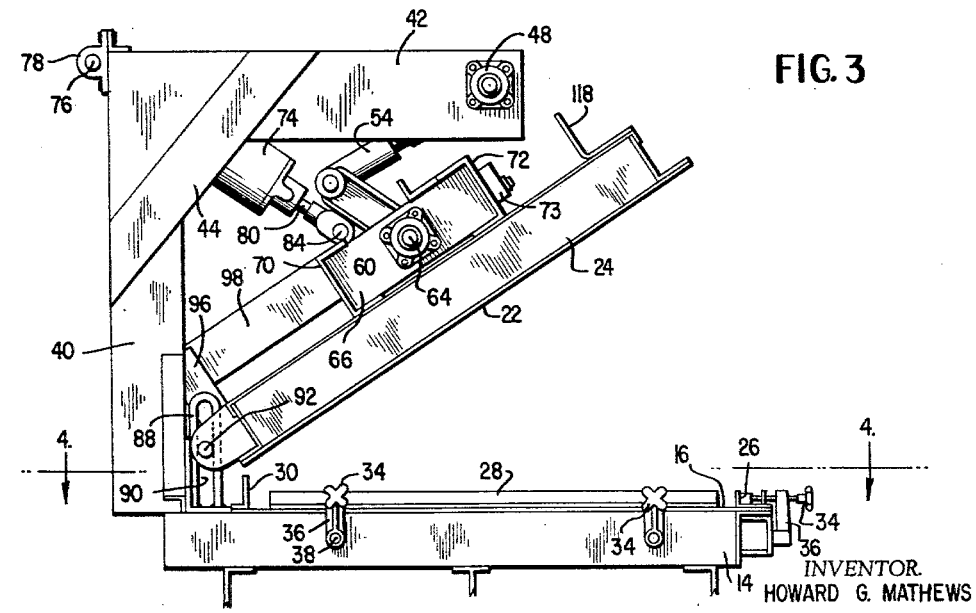
FIGURE 3 is a side view similar to FIGURE 2 but with the upper platen moved into an elevated open position.

Three pneumatic cylinders 74 are supported upon the mold frame at a shaft 76 and a suitable bearing bracket 78. As shown in FIGURES 2 and 3, cylinders 74 are inclined downwardly at an angle of approximately 45° and actuate piston rods 80. Rods 80 have forked lower ends 82 which are operatively connected to the lower arms of the hold down arms by pins 84 secured to blocks 86 which are mounted upon arm links 60.

A sliding hinge assembly at the rear of upper platen 24 allows the cylinders 74 to move the upper platen into the open position shown in FIGURE 3 as will be described in more detail subsequently. The sliding hinge assembly includes a plurality of vertical hinges 88 provided with vertical slots 90 guiding a bearing shaft 92 which is received in plates 94 extending rearwardly from the upper platen 24. An elevating arm 96 which is essentially vertical in the closed operating position illustrated in FIGURE 2 is rigidly secured to upper platen 24 by welding and by a reinforcing beam 98 connecting the upper end of the arm 96 to U-shaped channel member 70. Arm 96 is positioned to engage bearing shaft 92 as the mold is moved into the open position.

Air control levers 100 and 102 mounted at the front end of the mold upon support 10 regulate the flow of fluid to pneumatic cylinders 74. In order to raise the upper platen 24 from the closed operative position of FIGURE 2 into the open position of FIGURE 3 to remove a completed panel, the air flow to pneumatic cylinders 74 are regulated to retract piston arms 80. Retraction of arms 80 commences an upward and rearward movement of upper platen 24 and the associated structure mounted thereupon. Elevating arm 96 contacts bearing shaft 92 which is slidable within slots 90. As arm 96 undergoes a pivotable movement with respect to shaft 92, arm 96 is effective to depress shaft 92 in slot 90 from the upper position shown in FIGURE 2 to the lower position shown in FIGURE 3. Simultaneously with this movement, the front of platen 24 is pivoted upwardly into the open position shown in FIGURE 3. To accommodate the upward movement of the lower platen, the hold-down arms are moved to the retracted position shown in FIGURE 3 by means of the retraction of piston rods 80, the counter-clockwise movement of links 60 with reference to an axis through shafts 64, the rotation of forked upper ends 62 at the shaft 58 which enables swinging movement of links 60 with respect to the upper arm portions of the hold-down arms, and the clockwise movement of the upper arms about an axis through shaft 46. Pneumatic cylinders 74 maintain the mold in the open elevated position so that the mold form 20 and the finished panel may be removed after loosening screw adjusting members 34 which regulate the position of guide members 26 and 28. After the panel is removed, and the mold form is prepared for another molding operation, pneumatic cylinders 74 are actuated to lower upper platen 24 into the closed operative position. In this position, the hold-down arms are effective to maintain an essentially equal pressure along the length of the platens.

To change the thickness of the panels, it is only necessary to provide a mold form 20 of another height, and to change the effective length of the hold-down arms for upper platen 24. This latter change is readily accomplished by rotating adjusting members 54 by a suitable tool. The sliding hinge arrangement 88, etc., inherently compensates for changes in the height of mold 20 which results in corresponding changes in the position of upper platen 24 in the closed mold position.

Figure 4:
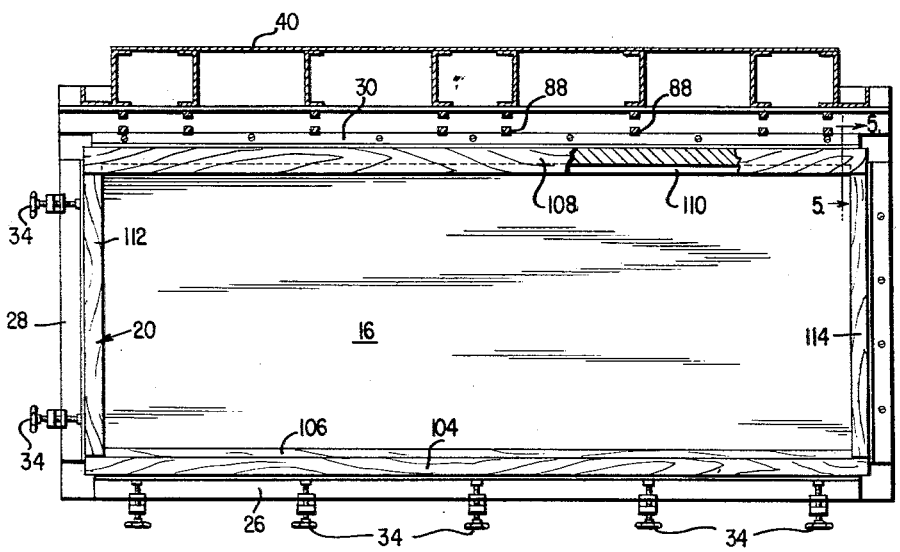
FIGURE 4 is a horizontal sectional view taken along the line 4—4 of FIGURE 3 showing the details of mold forms for producing a panel having integral edge joint portions with a portion of one of the forms broken away for the sake of clarity.
Figure 5:
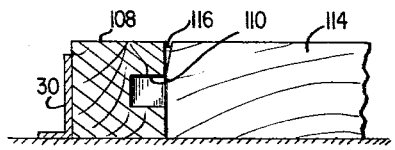
FIGURE 5 is a vertical sectional view along the line 5—5 of FIGURE 4 showing further details of the forms for producing a panel having integral joint portions.

FIGURES 4 and 5 illustrate the details of the mold form 20 used in producing a panel having integral tongue and groove joint portions along opposite longitudinal edges of the panel. Mold form 20 is made of any suitable material such as a hard wood, and includes a front wall 104 having a tongue 106 which forms a complementary groove in the finished panel, a rear wall 108 having a rectangular recess or groove 110 forming a tongue in the finished panel, and side walls 112 and 114. The corners between the walls of the mold form may be simple butt joints or the wall members may be provided with any suitable interlocking means such as pins or the like as described in my copending application Serial No. 144,877 filed October 13, 1961 for "Plastic Foams." Prior to assembly, release means such as sheets of wax paper are placed in position so as to partly surround the walls of mold form 20 to prevent the finished panel from sticking to the mold forms. The upper corners at each end of side walls 112 and 114 are tapered over about ⅓ or less the height of the side walls as shown at 116 in FIGURE 5. Preferably the taper of recesses 116 is in the order of a fraction of an inch, for example ¹⁄₆₄ of an inch. Recesses 116 extend from the interior of the mold to the atmosphere so as to vent air and gases evolved in the mold during the foaming and/or laminating procedures. The foam evolved in the mold will have its ultimate configuration substantially determined, and will be in a thick tacky state before the foam reaches the upper third of the foam. Additionally, recesses 116 are preferably at least partially covered by wax paper functioning as a sealing and release means. Gases may be exhausted through the mold from recesses 116 with negligible passage of foam into the recesses. The pressures generated within the mold will be sufficient to force gases out through recesses 116 notwithstanding the presence of the wax paper and the small size of the recesses. It will be appreciated that the size and internal configuration of mold form 20 determines the size and configuration of the finished panel, and that by substituting other mold forms, panels of different configuration may be produced.

L-shaped angle irons 118 are positioned on top of upper platen 24 to serve as a readily accessible place for storing the walls of mold forms during the removal of one panel from the mold, and the preparation of the mold for the next foaming operation.

Figure 6:
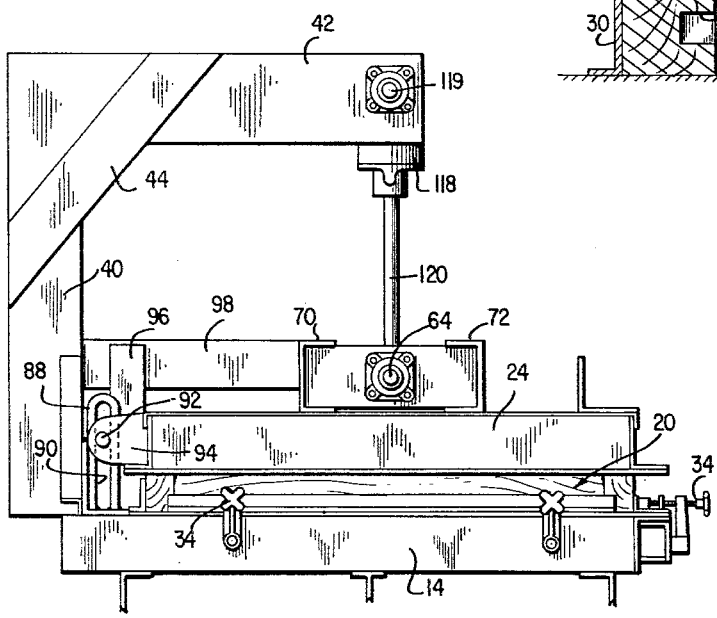
FIGURE 6 is a side view of a mold in accordance with another embodiment of the present invention.

FIGURE 6 illustrates another embodiment of the present invention wherein like reference numerals designate like parts in the previously described embodiment. In the FIGURE 6 embodiment, three hydraulic cylinders 118 are utilized in lieu of the hold-down arm assembly and the pneumatic cylinders of the previous embodiment. The essentially vertically positioned hydraulic cylinders 118 are pivotably mounted at their upper ends to shaft 119. Piston rods 120 actuated by cylinders 118 are rotatably mounted at their lower ends for pivotable movement upon shafts 64. The remainder of the structure illustrated in FIGURE 6 is similar to that described above in connection with the first-described embodiment.

When the mold is to be moved into the open inoperative position, the rods 120 of hydraulic cylinders 118 are retracted, resulting in an elevation of upper platen 24. Arm 96 again bears upon bearing shaft 92 and depresses the same as the upper platen moves upwardly. Pivotable mounting of cylinders 118 at shaft 119 and the pivotable mounting of the bottom ends of rods 120 at shaft 64 enable the hydraulic cylinder assembly to be moved clockwise as shown in FIGURE 6 to elevate the upper platen 24 into a position similar to that shown in FIGURE 3.

While pneumatic cylinders could be used in this embodiment, the hydraulic cylinders are preferred since greater pressures may be obtained with the use of hydraulic cylinders. By using three cylinders 118 spaced along the upper platen, sufficient pressures are obtained to hold the upper platen in position during the foaming cycle without utilizing unusually large hydraulic cylinders.

While I have shown and described several embodiments in accordance with the present invention, it will be appreciated that the invention is not limited to the specific details shown and described. For example, mold forms of many different types may be used in conjunction with the described molds. It is also apparent that the molds of the present invention may be used to produce either rigid or soft plastic bodies with or without laminate covers. Accordingly, it is intended to encompass all such changes and modifications as fall within the scope and spirit of the appended claims.

I claim:

1. A mold comprising frame means, a lower platen and an upper platen pivotable with respect to said lower platen, upper platen elevating means secured to said frame means and including fluid pressure actuated piston means having piston rod means, rotatable shaft means supported upon the top of said upper platen and extending in the longitudinal direction thereof, said piston rod means having lower ends secured to said shaft means, and hinge means extending along one longitudinal side of said upper platen to enable upward movement thereof, said hinge means including means defining a plurality of aligned, essentially vertical slots, a bearing shaft supported upon said upper platen and slidable within said slots, and elevating arm means connected to said upper platen and positioned adjacent to said shaft bearing to engage said shaft bearing upon upward movement of said upper platen towards an open mold position.

2. A mold comprising a lower platen and an upper platen movable with respect to said lower platen, frame means including a portion extending above said platens, hold-down arm means positioned between said portion of said frame means and said upper platen, said hold-down arm means including a plurality of upper and lower arm portions pivotally connected to each other and being essentially in vertical alignment in a closed mold position, platen elevating means secured to said frame means and including fluid pressure actuated cylinder means having piston means, piston rod portions operatively connected to said upper platen, and hinge means at the rear of said upper platen including means provided with essentially vertical slots and a shaft connected to said upper platen and slidable within said slots whereby said upper platen may be moved to an inclined open position and elevating arm means connected to said upper platen adjacent to said shaft and engaging said shaft upon opening of said mold.

3. A mold comprising a lower platen and an upper platen movable with respect to said lower platen, frame means including a frame portion extending above said platens, hold-down arm means positioned between said frame portion and said upper platen, said hold-down arm means including a plurality of upper and lower arm portions pivotally connected to each other and being essentially in vertical alignment in a closed mold position, each upper arm portion being connected to rotatable shaft means mounted at said frame portion, each lower arm portion being pivotally connected to said upper platen, platen elevating means secured to said frame means and including fluid pressure actuated cylinder means having piston means, said piston means including inclined piston rod portions operatively connected to said upper platen, and hinge means at the rear of said upper platen including means provided with essentially vertical slots and a shaft connected to said upper platen and slidable within said slots whereby said upper platen may be moved to an inclined open position and elevating arm means connected to said upper platen adjacent to said shaft and engaging said shaft upon opening of said mold.

4. A mold comprising frame means, a lower platen and an upper platen pivotable within respect to said lower platen, at least two longitudinally spaced essentially vertical hold-down arm assemblies supported at one end thereof upon said frame means and at the other end pivotally connected to said upper platen, upper platen elevating means including at least two fluid pressure actuated cylinder means secured to said frame means and having piston rod portions pivotally connected to said upper platen, and hinge means to enable upward movement of said upper platen, said hinge means including a plurality of spaced hinge members fixed to said lower platen and each provided with an essentially vertical slot, a shaft connected to said upper platen and slidable within said slots, and elevating arm means connected to said upper platen adjacent to said shaft for depressing said shaft upon opening of said mold.

5. A mold comprising a lower platen and an upper platen pivotable with respect to said lower platen, frame means including a frame portion extending over said platens, hold-down arm means positioned between said frame portion and said upper platen, said hold-down arm means including a plurality of upper and lower arm portions, said upper arm portions having upper ends fixed to rotatable shaft means mounted at said frame portion, said upper arm portions having lower ends fixed upon essentially horizontal shaft means extending in the longitudinal direction of the mold, a plurality of longitudinally spaced hinge members fixed to said lower platen and each provided with an essentially vertical slot positioned at the rear of said upper platen, a shaft connected to said upper platen and slidable within said slot, and upper platen elevating means to pivot the front of said upper platen upwardly while depressing said shaft within said slots.

6. A mold comprising a lower platen and an upper platen pivotable with respect to said lower platen, frame means including a frame portion extending over said platens, hold-down arm means positioned between said frame portion and said upper platen, said hold-down arm means including a plurality of upper and lower arm portions, said upper arm portions being provided with length adjusting means, said upper arm portions having upper ends fixed to rotatable shaft means mounted at said frame portion, said upper arm portions having lower ends fixed upon essentially horizontal shaft means extending in the longitudinal direction of the mold, a plurality of longitudinally spaced hinge members each provided with an essentially vertical slot positioned at the rear of said upper platen, a shaft connected to said upper platen and slidable within said slot, and upper platen elevating means to pivot the front of said upper platen upwardly while depressing said shaft within said slots.

7. A mold comprising a lower platen and an upper platen pivotable with respect to said lower platen, frame means including a frame portion extending over said platens, hold-down arm means positioned between said frame portion and said upper platen, said hold-down arm means including a plurality of upper and lower arm portions, said upper arm portions being provided with length adjusting means, said upper arm portions having upper ends fixed to rotatable shaft means mounted at said frame portion, said upper arm portions having lower ends fixed upon essentially horizontal shaft means extending in the longitudinal direction of the mold, said lower arm portions having forked upper ends rotatably mounted upon said horizontal shaft means, said lower arm portions being pivotably supported at stub shafts mounted upon said upper platen, a plurality of longitudinally spaced hinge members each provided with an essentially vertical slot positioned at the rear of said upper platen, a shaft connected to said upper platen and slidable within said slot, and upper platen elevating means to pivot the front of said upper platen upwardly while depressing said shaft within said slots.

References Cited in the file of this patent

UNITED STATES PATENTS

| | | |
|---|---|---|
| 1,699,102 | Fairchild | Jan. 13, 1929 |
| 1,809,856 | Lehman | June 16, 1931 |
| 1,932,063 | Brown | Oct. 24, 1933 |
| 2,792,592 | McGee | May 21, 1937 |
| 2,518,594 | Blanchard et al. | Aug. 15, 1950 |
| 2,929,104 | Hutton | Mar. 22, 1960 |